United States Patent
Davis et al.

(10) Patent No.: US 11,010,585 B2
(45) Date of Patent: May 18, 2021

(54) SEQUENCED ILLUMINATION OF NEARBY OBJECT WITH CUE MARKS

(71) Applicant: Synaptics Incorporated, San Jose, CA (US)

(72) Inventors: Bjoren Davis, San Jose, CA (US); Adam L. Schwartz, San Jose, CA (US); Alvin Jee, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 24 days.

(21) Appl. No.: 16/456,196

(22) Filed: Jun. 28, 2019

(65) Prior Publication Data

US 2020/0410200 A1    Dec. 31, 2020

(51) Int. Cl.
*G06K 9/00* (2006.01)
*G06K 9/20* (2006.01)

(52) U.S. Cl.
CPC ......... *G06K 9/0004* (2013.01); *G06K 9/2036* (2013.01)

(58) Field of Classification Search
CPC ...... G06K 9/0004; G06F 3/042; G06F 3/0421
See application file for complete search history.

(56) References Cited

U.S. PATENT DOCUMENTS

| | | | |
|---|---|---|---|
| 10,541,280 B1 * | 1/2020 | Krah | G06F 3/0412 |
| 2017/0272526 A1 * | 9/2017 | Bazar | H04L 67/22 |
| 2018/0046281 A1 * | 2/2018 | Pi | G06K 9/00114 |

\* cited by examiner

*Primary Examiner* — Yuzhen Shen
(74) *Attorney, Agent, or Firm* — Leydig, Voit & Mayer, Ltd.

(57) ABSTRACT

Systems and methods for optical imaging are disclosed. An optical sensing system, including a display, an optical sensor, and a processor communicatively coupled to the display and the optical sensor is provided. The processor is configured to execute an input object image capture method. The method determines that an input object is proximate to an optical sensing region of the display, and in response to determining that an input object is proximate to the sensing region of the display, the optical sensing system illuminates the sensing region with an illumination sequence. The illumination sequence includes a cue mark sequence preceding an illumination pattern, where the cue mark sequence contains information about the illumination pattern.

20 Claims, 5 Drawing Sheets

SEQUENCED ILLUMINATION OF NEARBY OBJECT WITH CUE MARKS

FIELD

Embodiments disclosed herein generally relate to optical sensors, and more particularly to an optical sensor for collecting object information.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes.

Various types of sensors may be used for biometric imaging. One such sensor is an optical sensor that relies on capturing light reflecting from an input object in order to create an image of the input object. Because the image of the input object is collected under varying conditions, such as varying temperatures, humidity and lighting conditions, some level of variance in the image is introduced based on environmental conditions. For consistency and accuracy in authenticating and verifying users from the image, minimizing this variance is preferable.

BRIEF SUMMARY OF THE INVENTION

In a particular embodiment, an optical sensing system is provided. The optical sensing system includes: a display; an optical sensor; and a processor communicatively coupled to the display and the optical sensor. The processor is configured to execute an input object image capture method including: determining that an input object is within a sensing region of the display; and in response to determining that an input object is within the sensing region of the display, illuminating the sensing region with an illumination sequence, the illumination sequence comprising a cue mark sequence preceding an illumination pattern.

In another embodiment, an input object image capture method is provided. The method includes: determining that an input object is within a sensing region of the display; and in response to determining that an input object is within the sensing region of the display, illuminating the sensing region with an illumination sequence, the illumination sequence comprising a cue mark sequence preceding an illumination pattern.

In yet another embodiment, a non-transitory computer readable medium storing instructions for capturing an input object image is provided. The instructions, when executed by a computer, cause the computer to carry out steps including: determining that an input object is within a sensing region of the display; and in response to determining that an input object is within the sensing region of the display, illuminating the sensing region with an illumination sequence, the illumination sequence comprising a cue mark sequence preceding an illumination pattern.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments of the disclosure provide methods and systems to optically image an input object such as a user's fingerprint. In particular, a method and system are described where an optical sensor provided in conjunction with a display illuminates the input object with one or more illumination patterns or colors while the optical sensor collects images of the input object. In certain embodiments, collection of these images is aided by the use of one or more cue marks that contain coded information related to the illumination pattern that can be captured by the optical sensor and decoded by a processor associated with the optical sensor. In this manner, a robust collection of input object images are quickly and efficiently collected under various lighting conditions. This collection of images can be post-processed in accordance with the coded information from the one or more cue marks in order to produce a single optimal-quality image.

Figure 1:
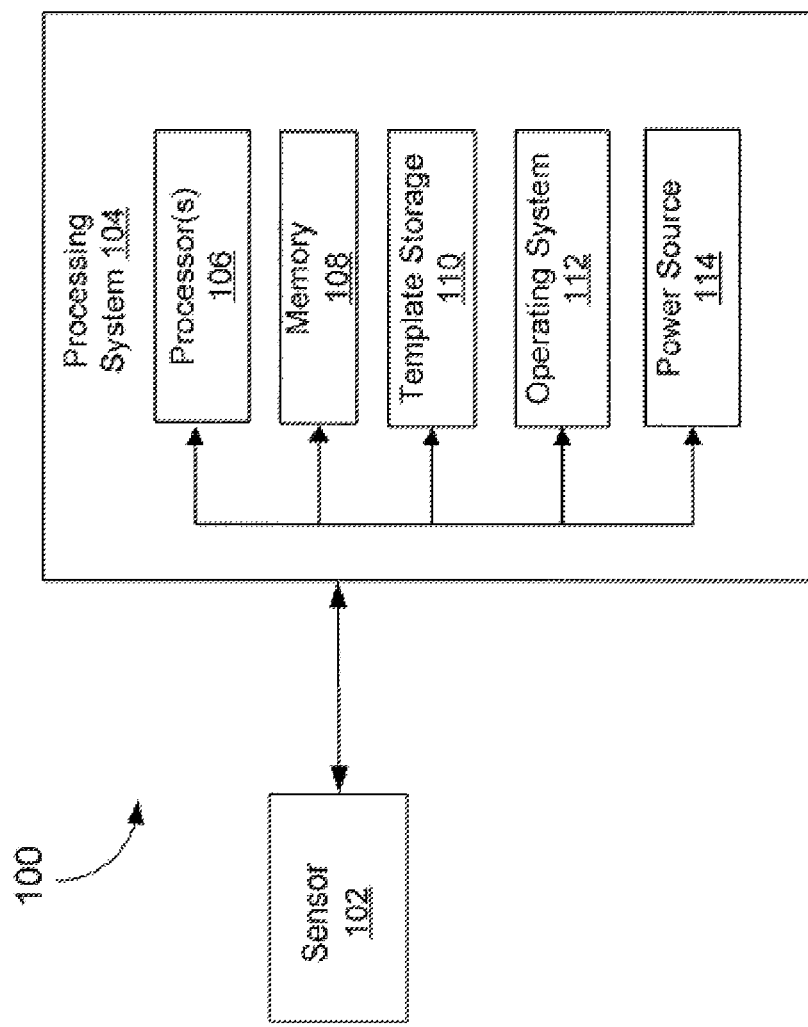
FIG. 1 is a block diagram of an example of a system that includes an optical sensor and a processing system according to an embodiment of the disclosure.

FIG. 1 is a block diagram of an example of an electronic system 100 that includes an optical sensor device 102 and a processing system 104, according to an embodiment of the disclosure. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Optical sensor 102 can be implemented as a physical part of the electronic system 100, or can be physically separate from the electronic system 100. As appropriate, the optical sensor 102 may communicate with parts of the electronic system 100 using any one or more of the following: buses, networks, and other wired or wireless interconnections. In some embodiments, optical sensor 102 is implemented as a fingerprint sensor to capture a fingerprint image of a user. In accordance with the disclosure, the optical sensor 102 uses optical sensing for the purpose of object imaging including imaging biometrics such as fingerprints. The optical sensor 102 can be incorporated as part of a display, for example, or may be a discrete sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

The optical sensor 102 may provide illumination to a sensing region of the optical sensor 102. Reflections from the sensing region in the illumination wavelength(s) are detected to determine input information corresponding to the input object.

The optical sensor 102 may utilize principles of direct illumination of the input object, which may or may not be in contact with a sensing surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the sensing surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the sensing surface.

Figure 2:
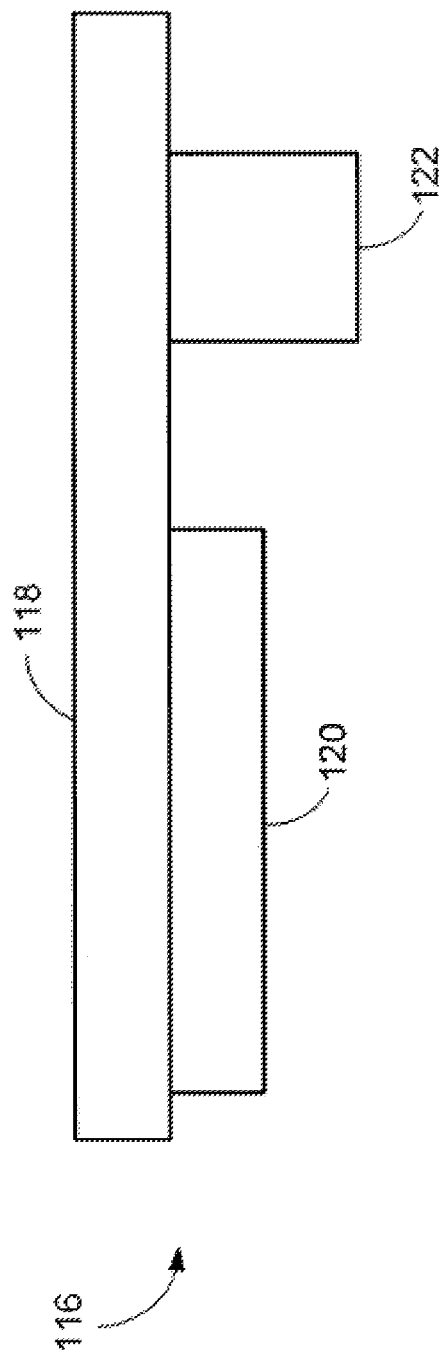
FIG. 2 illustrates an example of a mobile device that includes an optical sensor according to an embodiment of the disclosure.

FIG. 2 illustrates an example of an electronic device 116, such as a mobile phone, which includes cover glass 118 over a display 120. The disclosed method and system may be implemented by using a sensing region of the display 120 as the optical sensor to image an input object. Alternatively, a separate discrete component 122 provides the optical sensing capabilities. A discrete sensor may provide more flexibility in designing the optical components of the sensor for optimum illumination and/or signal conditioning than when attempting to integrate the optical sensor components on a display substrate, such as a TFT backplane.

Embodiments of the disclosure can be performed by an optical sensor and processing system, such as optical sensor 102 (see FIG. 1) and processing system 104. In various embodiments, the optical sensor 102 may be embedded within the display 120 or it may be part of the separate discrete component 122. For ease of discussion and reference, subsequent discussion of illumination sequences, including cue marks and illumination patterns, will be described as being performed by the optical sensor 102 embedded in the display 120. However, other optical sensing structures are contemplated, such as the discrete component 122 or any structure configured for optical sensing of an input object.

Figure 3:
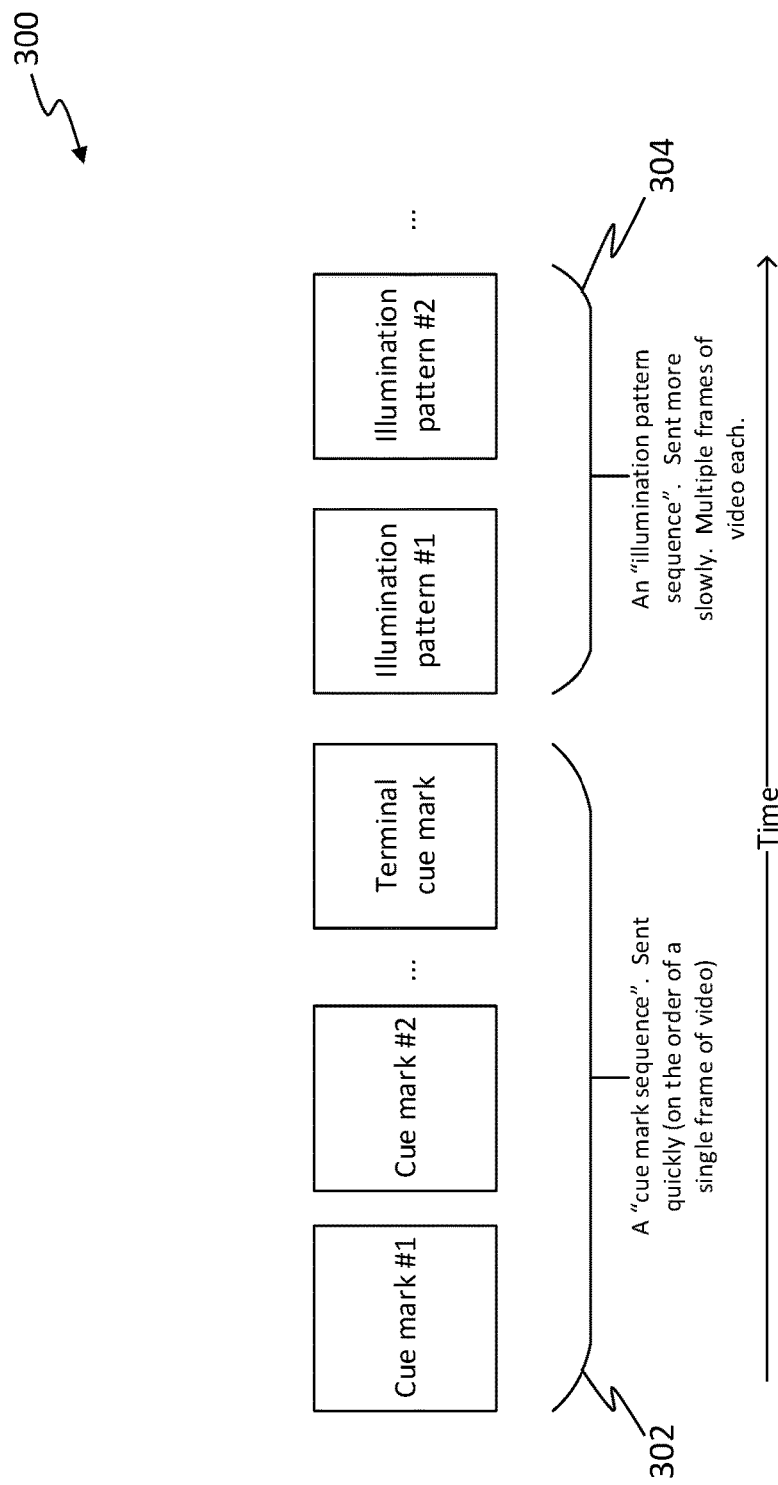
FIG. 3 illustrates an illumination sequence utilizing cue marks according to an embodiment of the disclosure.

FIG. 3 illustrates an illumination sequence 300, in accordance with an embodiment of the disclosure. As shown, illumination sequence 300 includes a cue mark sequence 302 followed by an illumination pattern sequence 304. In a particular embodiment, the cue mark sequence 302 followed by illumination pattern sequence 304 is played as a video within a sensing region of the display 120 (see FIG. 2) directly underneath an object being imaged by the optical sensor 102 (see FIG. 1). In the illustrated embodiment, the cue mark sequence 302 includes a plurality of cue marks, including a cue mark 1, a cue mark 2 and a terminal cue mark. Each of the cue marks 1 and 2 and the terminal cue mark may include information about the illumination pattern sequence 304, where the terminal cue mark indicates that the cue mark sequence 302 is complete and the illumination pattern sequence 304 is to begin.

The information contained in the cue mark sequence 302 allows the optical sensor 102 (see FIG. 1) and processing system 104 to know how to process object images it will acquire during the illumination pattern sequence 304. In certain embodiments, the cue marks are patterns of light and dark, such as Quick Response (QR) codes, barcodes and other such coded images. The cue marks are configured such that the optical sensor 102 is able to acquire them quickly. For instance, in certain embodiments, in order to acquire an image quickly, the optical sensor 102 could be operated with a reduced pixel depth, or with a reduced sensing "region of interest" (ROI). By making the cue marks quick to acquire, it allows the optical sensor 102 to latch on to the image sequence timing phase in a minimum amount of time, which has negligible effect on the overall latency of capturing object images.

Illumination pattern sequence 304 may contain a wide variety of patterns, colors, types of light (e.g., non-localized infrared or ultraviolet light), and sequences of patterns. Because the object is close to the source of light, these different illumination patterns and colors can produce different acquired images. The different illumination patterns can take a variety of forms, such as checkerboard illumination, different colors, or light followed by dark. The illumination pattern sequence 304 may be configured to examine certain aspects of the image or to better acquire an image under certain conditions. For example, the illumination pattern sequence 304 could be used as part of an anti-spoof mechanism for a finger by using a "zebra" stripe pattern to enhance shadow to show curvature of the fingertip. The illumination pattern sequence 304 could also be used as a way to deal with excessive ambient light by providing one frame of full illumination followed by another of no illumination, such that the image acquired with no illumination could be subtracted from the full illumination image to provide an image made up only of reflected light. By acquiring multiple images of the input object while displaying a sequence of illumination and then performing post-processing in accordance with the illumination pattern sequence 304, a robust and optimal-quality image of the object can be produced.

To capture images during the illumination sequence 300, the optical sensor 102 (see FIG. 1) starts by operating in a fast mode to quickly find the cue mark sequence 302 and lock on to the illumination pattern sequence 304. After seeing the cue mark sequence 302, while identifying the ensuing illumination pattern sequence 304, the optical sensor 102 acquires normal images of the object being imaged in phase with the presentation of the illumination pattern sequence 304. After collection of the normal images, the processing system 104 performs post-processing on the images (e.g., subtracting one image from another, adding disjoint regions of images together, etc.) in accordance with the information about the illumination pattern sequence 304 contained in the cue mark sequence 302 to create an optimal-quality image of the object (e.g., a fingerprint of a user's finger).

In certain embodiments, the optical sensor 102 (see FIG. 1) is inherently synchronized with the illumination sequence 300 video being shown on the display 120 (see FIG. 2) in that most displays are optimized for rapid playing of video, such as a video playing at 30 frames per second (fps). Accordingly, as long as the optical sensor 102 can identify the image sequence illuminating the object, then processing system 104 can efficiently and accurately apply the correct post-processing of the gathered images without additional synchronization information.

Figure 4:
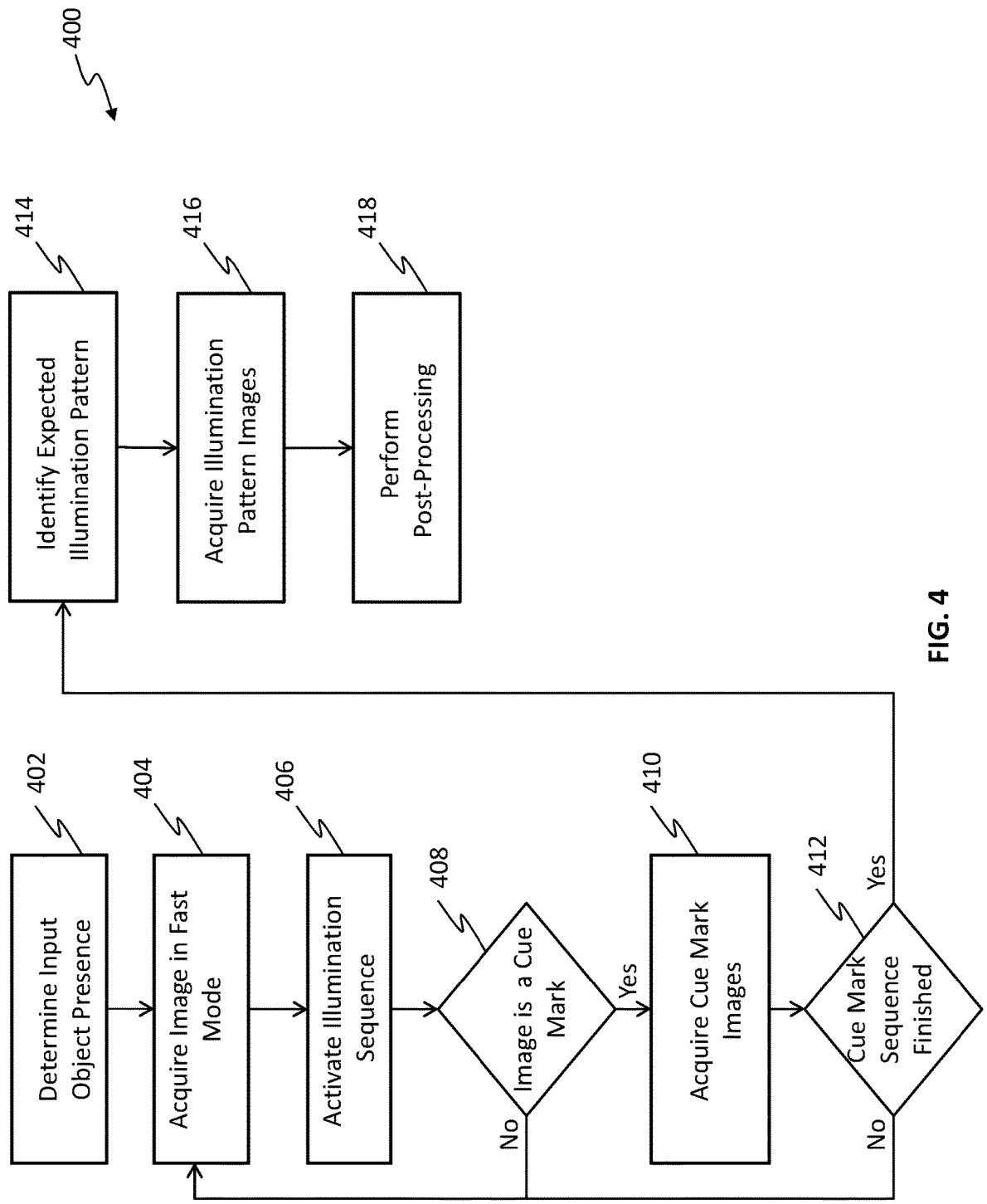
FIG. 4 illustrates an input object image capture flow chart utilizing cue marks, in accordance with an embodiment of the disclosure.

FIG. 4 illustrates an input object image capture flow chart 400, in accordance with a particular embodiment of the disclosure. The input object image capture flow chart 400 provides steps for capturing images of an input object (e.g., a user's fingerprint) while displaying an illumination pattern sequence directly under the input object, where information about the illumination pattern sequence is provided in one or more cue marks that precede the illumination pattern sequence.

At step 402, an optical sensor, such as optical sensor 102 (see FIG. 1), determines that an input object is present within a sensing region of a display, such as the display 120 (see FIG. 2). At step 404, the optical sensor 102 operates to acquire images at a rate sufficient to capture and process a single image of the "cue mark sequence" (fast mode). At step 406, the display 120 is activated to begin an illumination sequence, such as illumination sequence 300 (see FIG. 3). In certain embodiments, steps 404 and 406 are performed simultaneously.

At step 408, the processing system 104 (see FIG. 1) quickly scans the image to determine whether an image captured in fast mode is a cue mark image. If it is not a cue mark image, then the optical sensor 102 returns to the fast mode to acquire further images at step 404. However, if the image is a cue mark, then, at step 410, the optical sensor 102 captures cue mark images. At step 412, the processing system 104 continues to analyze the cue mark images to determine whether a current cue mark image is a terminal cue mark. If it is not a terminal cue mark, then the optical sensor 102 returns to the fast mode to acquire further images at step 404. However, if the image is a terminal cue mark, then, at step 414, the processing system 104 identifies an expected illumination pattern sequence based on decoding the information contained in the collected cue mark images. At step 416, the optical sensor 102 collects illumination pattern images of the input object with the expected illumination from the illumination pattern sequence. Once collection of the illumination pattern images is complete, at step 418, the processing system 104 performs post-processing on the illumination pattern images in accordance with the illumination pattern sequence information contained in the cue marks.

Figure 5:
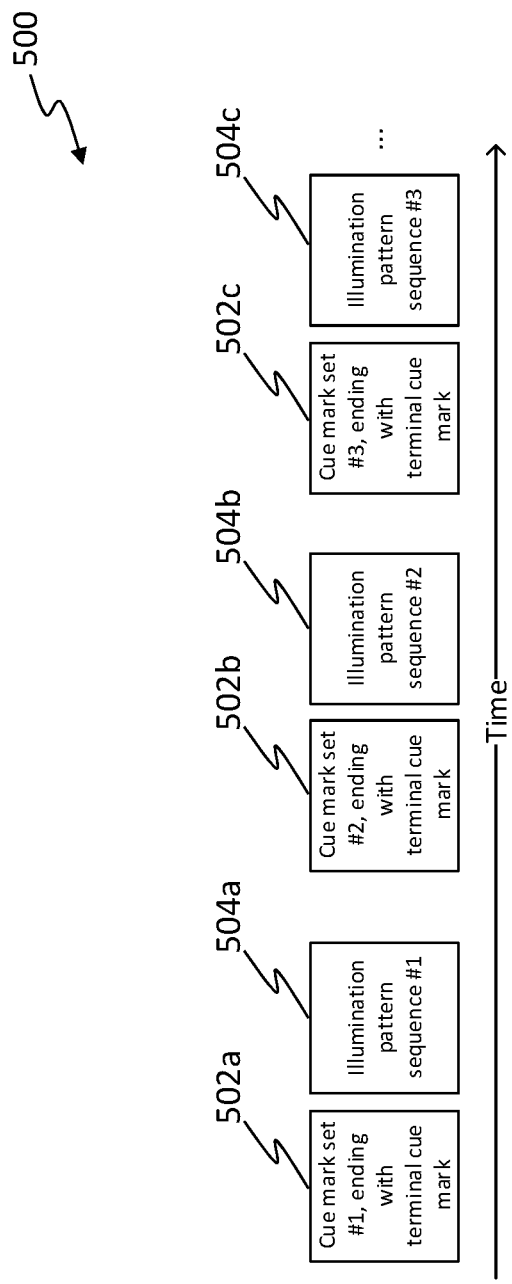
FIG. 5 illustrates an illumination sequence utilizing cue mark sets according to an embodiment of the disclosure.

FIG. 5 illustrates an illumination sequence 500 that utilizes multiple cue mark sets 502a, 502b and 502c and multiple illumination pattern sequences 504a, 504b and 504c. Each cue mark set 502a, 502b and 502c contains coded information regarding its subsequent illumination pattern sequence 504a, 504b and 504c. Similar to the cue mark sequence 302 (see FIG. 3) and the illumination pattern sequence 304, each cue mark set 502a, 502b and 502c contains one or more cue marks and a terminal cue mark, and each illumination pattern sequence 504a, 504b and 504c contains one or more illumination patterns to be displayed directly under an input object to be imaged. In this manner, the processing system 104 (see FIG. 1) can receive pattern information about multiple illumination pattern sequences 504a, 504b and 504c from multiple cue mark sets 502a, 502b and 502c.

In a particular embodiment, the illumination pattern sequences 504b and 504c are selected from optional pre-configured illumination pattern sequences based on a result of the processed image of the input object collected during the illumination patter sequence 504a. For instance, during processing of the illumination pattern images collected during the illumination pattern sequence 504a, the processing system 104 (see FIG. 1) may determine that other illumination patterns may give better results under current use conditions (e.g., temperature, light or humidity). Accordingly, the processing system 104 may instruct the optical sensor 102 embedded in the display 120 (see FIG. 2) to perform the image collection of the input object using the cue mark sets 502b and 502c along with their respective illumination pattern sequences 504b and 504c in order to account for the current use conditions. In this manner, an optimal-quality image may be collected.

Although this disclosure describes optical object imaging in the context of fingerprint image sensing, the method and system may be used to image any object. For example, an image of a palm or hand, a face, an eye or any other distinguishing structure may be acquired by placing the object directly on or proximate the optical sensor. Imaging of non-biometric objects is also within the scope of this disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical sensing system, comprising:
   a display;
   an optical sensor; and
   a processor communicatively coupled to the display and the optical sensor, the processor configured to execute an input object image capture method comprising:
      determining that an input object is within a sensing region of the display; and
      in response to determining that an input object is within the sensing region of the display, illuminating the sensing region with an illumination sequence, the illumination sequence comprising a cue mark sequence preceding an illumination pattern,
   wherein the cue mark sequence includes pattern information of the illumination pattern.

2. The system according to claim 1, wherein the illuminating is performed by the display.

3. The system according to claim 1, wherein the input object image capture method further comprises:
   acquiring illumination pattern images of the input object during the illuminating the sensing region with the illumination sequence; and
   generating object images using the illumination pattern images and the pattern information.

4. The system according to claim 1, wherein the input object image capture method further comprises:
   when the sensing region is illuminated with the cue mark sequence, operating the optical sensor at a reduced pixel depth while acquiring cue mark images of the input object.

5. The system according to claim 1, wherein the cue mark sequence is illuminated in the sensing region within a reduced region of interest.

6. The system according to claim 1, wherein the illumination pattern comprises one or more of: a checkerboard pattern, a series of patterns showing different colors, a white pattern followed by a black pattern, and a plurality of alternative black and white stripes.

7. The system according to claim 1, wherein the pattern information included in the cue mark sequence provides the optical sensor and the processor with information regarding how to process input object images acquired during the illumination pattern prior to capturing the input object images.

8. An input object image capture method performed by a sensing system, the method comprising:

determining that an input object is within a sensing region of a display of the sensing system; and in response to determining that an input object is within the sensing region of the display, illuminating the sensing region with an illumination sequence, the illumination sequence comprising a cue mark sequence preceding an illumination pattern, wherein the cue mark sequence includes pattern information of the illumination pattern.

9. The method according to claim 8, wherein the illuminating is performed by the display.

10. The method according to claim 8, further comprising:
acquiring illumination pattern images of the input object during the illuminating the sensing region with the illumination sequence; and
generating object images using the illumination pattern images and the pattern information.

11. The method according to claim 8, further comprising:
when the sensing region is illuminated with the cue mark sequence, operating the optical sensor at a reduced pixel depth while acquiring cue mark images of the input object.

12. The method according to claim 8, wherein the cue mark sequence is illuminated in the sensing region within a reduced region of interest.

13. The method according to claim 8, wherein the illumination pattern comprises one or more of: a checkerboard pattern, a series of patterns showing different colors, a white pattern followed by a black pattern, and a plurality of alternative black and white stripes.

14. The method according to claim 8, wherein the pattern information included in the cue mark sequence provides the sensing system with information regarding how to process input object images acquired during the illumination pattern prior to capturing the input object images.

15. A non-transitory computer readable medium storing instructions for performing an input object image capture method that, when executed by a computer, cause the computer to carry out steps comprising:
determining that an input object is within a sensing region of a display of a sensing system; and
in response to determining that an input object is within the sensing region of the display, illuminating the sensing region with an illumination sequence, the illumination sequence comprising a cue mark sequence preceding an illumination pattern,
wherein the cue mark sequence includes pattern information of the illumination pattern.

16. The non-transitory computer readable medium according to claim 15, wherein the illuminating is performed by the display.

17. The non-transitory computer readable medium according to claim 15, wherein the non-transitory computer readable medium stores further instructions that when executed by the computer, cause the computer to carry out steps further comprising:
acquiring illumination pattern images of the input object during the illuminating the sensing region with the illumination sequence; and
generating object images using the illumination pattern images and the pattern information.

18. The non-transitory computer readable medium according to claim 15, wherein the non-transitory computer readable medium stores further instructions that when executed by the computer, cause the computer to carry out steps further comprising:
when the sensing region is illuminated with the cue mark sequence, operating the optical sensor at a reduced pixel depth while acquiring cue mark images of the input object.

19. The non-transitory computer readable medium according to claim 15, wherein the cue mark sequence is illuminated in the sensing region within a reduced region of interest.

20. The non-transitory computer readable medium according to claim 15, wherein the pattern information included in the cue mark sequence provides the sensing system with information regarding how to process input object images acquired during the illumination pattern prior to capturing the input object images.

* * * * *